US006527830B1

(12) United States Patent
Neu et al.

(10) Patent No.: US 6,527,830 B1
(45) Date of Patent: Mar. 4, 2003

(54) PRESSURE SWING ADSORPTION PROCESS FOR CO-PRODUCING NITROGEN AND OXYGEN

(75) Inventors: Bernard T. Neu, Lancaster, NY (US); James Smolarek, Boston, NY (US); Andrew C. Rosinski, Boston, NY (US); Mark William Ackley, East Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/968,925

(22) Filed: Oct. 3, 2001

(51) Int. Cl.[7] .............................................. B01D 53/047
(52) U.S. Cl. .............................. 95/98; 95/100; 95/105; 95/130
(58) Field of Search ...................... 95/96–98, 100–103, 95/105, 130

(56) References Cited

U.S. PATENT DOCUMENTS

| 4,013,429 A | 3/1977 | Sircar et al. ................... 55/33 |
| 4,359,328 A | * 11/1982 | Wilson ..................... 95/130 X |
| 4,515,605 A | * 5/1985 | Inoue et al. ............... 95/130 X |
| 4,599,094 A | 7/1986 | Werner et al. ................. 55/26 |
| 4,726,816 A | * 2/1988 | Fuderer .................... 95/100 X |
| 4,775,394 A | * 10/1988 | Yamano et al. ............... 95/101 |
| 4,810,265 A | 3/1989 | Lagree et al. .................. 55/26 |
| 4,892,565 A | 1/1990 | Schmidt et al. ................ 55/26 |
| 4,915,711 A | 4/1990 | Kumar .......................... 55/26 |
| 5,026,406 A | * 6/1991 | Kumar ......................... 95/101 |
| 5,163,978 A | 11/1992 | Leavitt et al. ................. 55/18 |
| 5,268,023 A | * 12/1993 | Kirner ......................... 95/103 |
| 5,922,107 A | * 7/1999 | Labasque et al. ......... 95/103 X |
| 6,045,603 A | * 4/2000 | Chen et al. ............... 95/103 X |
| 6,083,299 A | * 7/2000 | Kapoor et al. ............ 95/103 X |
| 6,113,672 A | * 9/2000 | Kapoor et al. ............ 95/103 X |

* cited by examiner

Primary Examiner—Robert H. Spitzer
(74) Attorney, Agent, or Firm—Robert J. Follett (57) ABSTRACT

A pressure swing adsorption process for recovery of a more readily adsorbable component, such as nitrogen, and a larger amount of a less readily adsorbable component, such as oxygen, from a feed gas mixture, such as air, wherein the ratio of nitrogen to oxygen is less than about 3:1 and the ratio of the co-purge:feed gas of the process is maintained at less than about 1.15:1.

20 Claims, 3 Drawing Sheets

Representative 12-Step Process Cycle for Bed A

Fig. 1

Representative 12-Step Process Cycle for Bed A

PRESSURE SWING ADSORPTION PROCESS FOR CO-PRODUCING NITROGEN AND OXYGEN

FIELD OF THE INVENTION

The invention relates to a pressure swing adsorption process for dual recovery of a more readily adsorbable component, such as nitrogen, and a less readily adsorbable component, such as oxygen, from a feed gas mixture in which the copurge:feed gas ratio of the process is less than about 1.15:1 so that the ratio of the more readily adsorbable component (nitrogen) to the less readily adsorbable component (oxygen) is less than about 3:1.

DESCRIPTION OF THE PRIOR ART

In numerous chemical processing, refinery, metal productions and other industrial applications, high purity oxygen or nitrogen may be needed. Enriched oxygen gas or nitrogen gas is frequently required for metal treating atmospheres and other applications. Nitrogen and oxygen gases can, of course, be obtained by various known techniques for air separation. Pressure swing adsorption (PSA) processing is particularly suited for such air separation in a variety of applications, particularly in relatively small sized operations for which the use of a cryogenic air separation plant may not be economically feasible.

The most common PSA systems produce a single enriched purity gas stream, usually the less readily adsorbable (light) component, from a given feed supply. In these systems, a feed gas mixture is passed through an adsorbent bed capable of selecting the more readily adsorbable (heavy) component at a higher pressure. The light component passes through the bed and is collected as product. The heavy component is then desorbed from the adsorbent at low pressure and exhausted from the system as waste. PSA systems are designed differently when the primary product of interest is the heavy component. In such systems, a co-current displacement purge, consisting of product quality gas, is passed through the bed in the direction of the feed following the feed step. The light component passes through the bed and is exhausted at the discharge end of the bed as waste. High purity heavy product is collected at the feed end of the bed through a series of blowdown, evacuation and purge steps. In either of the prior art systems, only a single component of the feed mixture is captured as product, while the remaining components are exhausted from the system as waste. In such cases, the waste stream is generally not sufficiently enriched in a desired component for use in a chemical or industrial application. In each of these systems, the unit cost of product is determined relative to the single product of interest, either the heavy or the light product.

U.S. Pat. No. 4,599,094 describes an air separation process in which the primary product is high purity nitrogen, but from which a reasonably high purity coproduct oxygen is also produced. This process uses a high-pressure ratio (ratio of maximum adsorption pressure to minimum desorption pressure) of ten or greater in combination with 13× molecular sieve. High nitrogen recovery is a major objective. Product ratios ($N_2:O_2$) much greater than 3:1, and even approaching the theoretical maximum of 4:1, are achievable with this process. Product nitrogen purities $\geq 99.8\%$ (with recovery $\geq 98\%$) and oxygen purities of 90% to 93.6% were demonstrated. A chief reason for such high recoveries and purities is that the oxygen/air mass transfer front, discharged in the adsorption step, is partitioned and completely refluxed to other beds in the process. This complexity and the high-pressure ratio generate high capital and operation costs resulting in expensive products.

U.S. Pat. No. 4,810,265 teaches a co-current displacement process for the production of nitrogen. Feed air is introduced into the inlet of the bed, nitrogen is selectively adsorbed and oxygen enriched gas is withdrawn from the discharge end of the bed. The air feed step is followed by a co-current purge (co-purge) displacement step in which high purity nitrogen is fed into the bottom of the bed while oxygen enriched gas continues to be withdrawn from the top. The nitrogen purge gas displaces the oxygen that had been co-adsorbed with nitrogen, as well as the oxygen remaining in the interparticle void space. The co-purge flow continues until the mass transfer front erupts from the discharge end of the bed and the oxygen purity degrades. The oxygen-rich (light component) gas is discharged from the top of the bed and is either vented as waste or collected for countercurrent purge and/or pressurization. The adsorbent and void spaces are then saturated with high purity heavy product. U.S. Pat. No. 4,810,265 also teaches the use of LiX or 13× adsorbents in the above-described process.

U.S. Pat. No. 4,013,429 relates to pressure swing adsorption process in which ambient air, during an on-stream period, is passed serially through a pretreatment adsorbent bed removing moisture and carbon dioxide therefrom. The dried and purified air is then passed through a main adsorbent bed selective for retention of nitrogen, the oxygen-rich effluent being collected in an expandable receiving vessel. The pretreatment and main adsorbents are contained in separate vessels connected in series. Nitrogen of high purity is desorbed by evacuation from the main bed in a direction opposite to that of the initial air charge. This nitrogen product passes from the main bed into and through the pretreatment bed to a collection vessel. Preceding the vacuum desorption step both the pretreatment bed and the main bed are rinsed with the high purity nitrogen product gas from a previous stage in the operation. Following evacuation, the beds are repressured with a portion of the oxygen-rich gas drawn from the expandable receiving vessel. By operation in the described manner there are recovered for any desired use, nitrogen of high purity (99.7 to 99.9%) and oxygen-enriched (78 to 90%) gas product. Recovery of both nitrogen and oxygen products is about 95%. Such high recovery of both products is indicative of prior art processes seeking to optimize the $N_2:O_2$ product ratio as near to 4:1 as possible. The process of U.S. Pat. No. 4,013,429 is both complex and expensive, having sixteen cycle steps, thirteen valves, four compression machines and three expandable gas receivers.

U.S. Pat. No. 4,892,565 relates to a process for recovery of a more selectively adsorbed key component from a gas mixture containing the key component and one or more less selectively adsorbed secondary components using vacuum swing adsorption. The process minimizes capital costs by reducing or eliminating gas storage vessels and reduces power requirements by operating without a feed compressor, whereby feed is introduced at least in part by vacuum conditions achieved by pressure equalization between parallel adsorption beds. The major thrust of this invention is the production of the more selectively adsorbed component at relatively high purity ($\geq 95\%$). Alternatively, at least a minor amount of less selectively adsorbed secondary component product can be recovered. Clearly for air separation, this three or four-bed process is directed at the recovery of the heavy nitrogen component alone, or alternatively at a high $N_2:O_2$ product ratio.

U.S. Pat. No. 4,915,711 relates to an adsorptive separation process set forth for recovery of two gas products in high recovery and high purity using adsorption, depressurization, low pressure purge, evacuation and repressurization. Depressurization and purge effluents are recycled to feed. Optionally, pressure equalizations are performed after the adsorption and after the evacuation steps. This invention is aimed at $CO_2/CH_4$ separation. In terms of an air separation option, only processes utilizing an oxygen-selective adsorbent are considered, i.e. the oxygen is the heavy component. The process also differs markedly from the present invention in the use of the co-current depressurization step following the adsorption step and in the use of the low-pressure purge of the heavy component.

The prior art has been primarily driven to produce high purity nitrogen (99.9% or greater) and to maximize the yield of nitrogen from such air separation processes. Oxygen has been recovered from such processes as an additional benefit to offset some of the costs of producing the high purity nitrogen. A perfect or ideal separation would yield nitrogen and oxygen products in a 4:1 ratio. In real processes, such as disclosed in U.S. Pat. No. 4,810,265 and U.S. Pat. No. 5,163,978, the recovery of the primary nitrogen product is maximized. The resulting product ratio ($N_2$:$O_2$) in such processes is well above 3:1. Thus, the prior art has apparently found that minimum nitrogen unit product cost corresponds to maximizing the $N_2$:$O_2$ product ratio to values greater than 3:1. A practical upper limit of this product ratio, which is necessarily less than the ideal ratio of 4:1, is the consequence of mass transfer resistances and the co-adsorption of nitrogen and oxygen in the mass transfer zone. In other words, it is impossible to remove all of the oxygen from the bed without losing a portion of the nitrogen.

Contrary to the PSA co-products air separation prior art, wherein maximizing the $N_2$:$O_2$ product ratio is desirable, the subject invention seeks $N_2$:$O_2$ product ratios less than 3:1. One aspect of the subject invention is that the light oxygen product amount can be increased if the co-purge:feed air ratio is decreased. Instead of simply venting excess high purity nitrogen product to obtain a lower product ratio, the novel process of the present invention reduces the co-purge:feed air ratio (e.g. by approximately 10%) to achieve a greater amount of light product and a corresponding lower $N_2$:$O_2$ product ratio. This results in a reduction in the unit cost of oxygen.

The utilization of an inlet blower, which provides the dual function of a feed air blower and a co-purge compressor, can be changed so that more feed air and less co-purge nitrogen are introduced into the adsorber bed. Thus, higher feed throughput and greater light component oxygen product are obtained using the same fixed-size equipment.

It is an object of the invention to provide a PSA process and system for the recovery of a more readily adsorbable gas component along with a less readily adsorbable gas component from a feed gas mixture wherein the amount of the less readily adsorbable (oxygen) gas is increased by regulating the ratio of the co-purge:feed gas to less than 1.15:1. Consequently, the ratio of the more readily adsorbable gas component to the less readily adsorbable gas component is decreased to less than 3:1.

It is another object of the subject invention to provide a PSA process and system capable of minimizing the capital costs, power consumption, and overall costs of recovering a greater amount of enriched oxygen product from air.

With these and other objects in mind, the subject invention is hereinafter described in detail, the novel features thereof being particularly pointed out in the appended claims.

SUMMARY OF THE INVENTION

The invention relates to a pressure swing adsorption/desorption process for the co-production of a more readily adsorbable gas component (such as nitrogen) and a less readily adsorbable gas component (such as oxygen) from a feed gas mixture comprising the feeding of the feed gas into at least one adsorbent bed containing an adsorbent material for pretreating or removing undesirable components and then through a main adsorbent bed. The feed gas mixture passes through the main adsorbent at elevated pressure wherein the heavy component is adsorbed and the light component exits as product. This step is followed in sequence by a co-current purge (co-purge in the same flow direction through the main adsorbent bed as the feed) of the high purity heavy product. Heavy product is recovered in subsequent countercurrent blowdown and evacuation steps. The main bed is then countercurrently purged and then repressurized with light product. Such cycle steps are carried out in a manner to produce a product ratio of the more readily adsorbable gas compound to the less readily adsorbable gas component of less than about 3:1, preferably about 2:1, wherein the co-purge:feed gas ratio is regulated to less than about 1.15:1, preferably less than 1.05:1.

When the feed mixture is preferably air, a representative process of the invention can be described as follows: (a) introducing the less readily adsorbable component (oxygen) into the discharge end of the bed to partially countercurrently repressurize the bed from a subatmospheric desorption pressure level to an intermediate pressure level, such countercurrent backfilling of the bed serving to displace any previously adsorbed more readily adsorbable gas component (nitrogen) toward the feed end of the bed;

(b) passing the feed gas mixture to the feed end of the bed, the bed being co-currently repressurized from said intermediate pressure to an upper adsorption pressure, with said more readily adsorbable gas component being selectively adsorbed and said less readily adsorbable gas component being selectively withdrawn from the discharge end of the bed in which a larger amount of less readily adsorbable gas is produced by maintaining a co-purge:feed gas ratio of less than about 1.15 in the process, a portion of said larger amount of the less readily adsorbable gas component being withdrawn from the system for other applications, the remaining portion of said less readily adsorbable gas component being passed directly to another bed in the system for said countercurrent backfilling repressurization of step (a) or for the purging of the bed and/or being passed to a surge tank for subsequent use in such backfilling or purge steps;

(c) passing the more readily adsorbable gas component to the feed end of the bed at said upper adsorption pressure so as to co-currently purge said bed with a co-purge:feed gas ratio of less than about 1:15:1, preferably less than about 1.05, and said less readily adsorbable gas component being withdrawn from the discharge end of the bed so that the bed is cleaned out of the less readily adsorbable gas component by said purge prior to the recovery of said more readily adsorbable gas component from the bed;

(d) countercurrently depressurizing the bed by discharging said more readily adsorbable gas component from the feed end of the bed, the pressure of the bed thereby being reduced first from the upper adsorption pressure to atmospheric pressure through blowdown and then to a subatmospheric desorption pressure level preferably through the use of a vacuum pump;

(e) countercurrently purging the bed at subatmospheric pressure by introducing said less readily adsorbable gas component to the discharge end of the bed and said more readily adsorbable gas component being discharged from the feed end of the bed preferably through a vacuum pump, thereby increasing the adsorptive capacity of the bed prior to the next succeeding pressurization adsorption step, and said more readily adsorbable gas either withdrawn from the system or stored in a surge tank for use as purge gas in the process; and (f) repeating steps (a)–(e) on a cycle basis with additional feed gas being passed to the bed during the carrying out of the process to maintain a co-purge:feed gas ratio to less than about 1.15:1 and thereby maintaining the ratio of said readily adsorbable component to said less readily adsorbable component gas to less than about 3:1.

If the less readily adsorbable component is oxygen and the more readily adsorbable component is nitrogen, then said oxygen could preferably have a purity of above about 60%, more preferably above about 80%, and said nitrogen could preferably have a purity of above about 98%, more preferably above about 99.8%; and such gases being conveniently obtained as low cost products in the simplified processing cycle of the invention.

The processing cycle of the invention generally comprises various pressurization and depressurization steps operating between a low (subatmospheric) desorption pressure and an upper (above-atmospheric) adsorption pressure, coupled with advantageous purge or displacement steps at said upper and lower pressures to enhance the recovery of the less readily adsorbable gas component recovered at the high desorption pressure and the recovery of the more readily adsorbable gas component at the lower desorption pressure. Various processing modifications can also be employed in particular embodiments to enhance the performance of the process and system of the invention as applied with respect to the requirements of particular air separation or other feed gas separation applications.

The subject invention is preferably practiced in a PSA system for the separation of oxygen and nitrogen from air wherein at least two adsorbent beds are employed, with each of the beds undergoing the processing cycle herein disclosed in an appropriate sequence as related to the other beds in the system so as to facilitate the carrying out of continuous gas separation operations in such a system. In preferred embodiments of the invention, two or three adsorbent beds are commonly employed.

It has been discovered, unexpectedly, that the oxygen product amount can be increased if the co-purge:feed gas ratio is decreased. Instead of simply venting excess high purity nitrogen product to obtain a lower product ratio, the novel process produces a system than can reduce the co-purge:feed air ratio to less than 1.15:1, preferably less than about 1.05:1. This will achieve a greater amount of the light product oxygen and thereby a lower nitrogen to oxygen ratio (less than about 3:1). This will also result in a reduction in the unit cost of oxygen.

The reduction in the co-purge:feed air ratio is accomplished by reducing the amount of time for co-purge and increasing the amount of time for air feed. Adsorbent efficiency can be further improved by monitoring and using the purity of the oxygen-rich gas discharged from the top of the bed to control the co-purge:feed air ratio. This novel process will maximize the amount of oxygen produced from a fixed amount of adsorbent material.

BRIEF DESCRIPTION OF THE DRAWINGS

FIG. 3 comprises three graphs in which

DETAILED DESCRIPTION OF THE INVENTION

The preferred process of the present invention is a co-current displacement cycle of a PSA system. The preferred embodiment of the cycle is a twelve-step process described below and shown in the cycle step diagram in FIG. 1. The preferred type of adsorbent is a highly exchanged, low Si/Al ratio LiX adsorbent, such as described in U.S. Pat. No. 4,589,217.

Step No. 1

Product Oxygen Pressurization

Oxygen enriched gas is taken from the oxygen product storage tank and introduced into the discharge end (top) of the adsorber.

Step No. 2

Overlap Feed Adsorption/Product Oxygen Pressurization

Feed air is introduced to the feed end (bottom) of the adsorber while oxygen product continues to enter the top of the adsorber.

Step No. 3

Raising Pressure Feed Adsorption and Beginning of Oxygen Make

Feed air continues to be introduced into the bottom of the adsorber. Oxygen product withdrawal from the top is initiated once the desired adsorption pressure is reached.

Step No. 4

Co-current Nitrogen Purge/Product Oxygen Make

Nitrogen product is taken from a nitrogen variable volume receiver, compressed and introduced into the bottom of the adsorber. Oxygen product is taken at the top of the adsorber.

Step No. 5

Co-current Nitrogen Purge/Product Oxygen Make

Nitrogen product is taken from the nitrogen variable volume receiver, compressed and introduced into the bottom of the adsorber. Oxygen product is taken at the top of the adsorber.

Step No. 6

Co-current Nitrogen Purge/ Oxygen Vent

Nitrogen product continues to be introduced into the bottom of the adsorber. Gas from the top of the adsorber is vented out of the system.

Step No. 7

Blowdown/Nitrogen Product

Product quality nitrogen is withdrawn from the bottom of the adsorber and is directed into a nitrogen variable volume receiver.

Step No. 8

Evacuation/Nitrogen Product

Nitrogen product is withdrawn from the bottom of the adsorber through a vacuum blower and discharged into the nitrogen variable volume receiver.

Step No. 9

Evacuation/Nitrogen Product

Nitrogen product is withdrawn from the bottom of the adsorber through a vacuum blower and discharged into the nitrogen variable volume receiver.

Step No. 10

Evacuation/Nitrogen Product/Oxygen Purge

Nitrogen product is withdrawn from the bottom of the adsorber through a vacuum blower and discharged into the nitrogen variable volume receiver. Oxygen from the product tank is introduced into the top of the adsorber vessel.

Step No. 11

Evacuation/Vent/Oxygen Purge

Nitrogen product is withdrawn from the bottom of the adsorber and vented from the system as waste. Oxygen from the product surge tank continues to flow into the top of the adsorber vessel.

Step No. 12

Evacuation/Vent/Oxygen Purge

Falling purity nitrogen is withdrawn from the bottom of the adsorber and vented from the system as waste. Oxygen from the product surge tank continues to flow into the top of the adsorber vessel.

The time period of each step and the change of pressure in each step are regulated so that the co-purge:feed gas ratio is maintained less than about 1.15. One of the novel aspects of the invention is in steps 11 and 12 which serve to increase the adsorption capacity of the bed.

Figure 1:
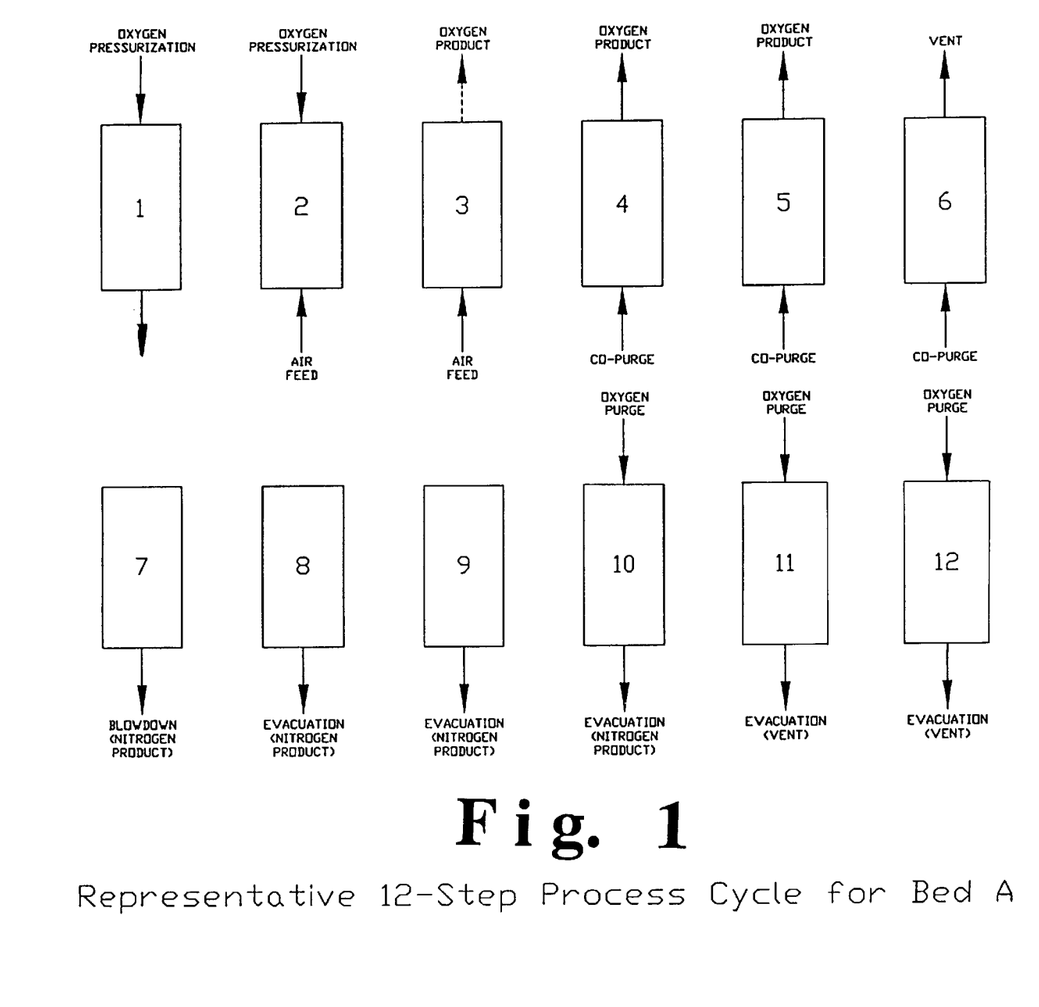
FIG. 1 is a schematic flow diagram of preferred steps for a vacuum PSA oxygen and nitrogen system of the invention.

FIG. 1 displays the 12 steps of this process. Following countercurrent pressurization with product oxygen (step 1), feed air is introduced into the inlet of the bed. Nitrogen is selectively adsorbed. Once the upper adsorption pressure is reached, oxygen enriched gas is withdrawn from the discharge end of the bed. The final air feed step (step 3) is followed by a co-current purge displacement (co-purge) step in which high purity nitrogen is fed into the bottom of the bed while oxygen enriched gas continues to be withdrawn from the top. The nitrogen purge gas displaces the co-adsorbed oxygen, as well as the oxygen remaining in the interparticle void space. The instantaneous purity of the oxygen rich gas withdrawn from the discharge end of the bed varies throughout the cycle. An enriched purity oxygen stream (typically >75%) is captured and sent to an oxygen product tank. The remainder of the discharge gas (lower purity oxygen) is vented from the system. In addition to product, the higher-purity oxygen collected in the storage tank is for countercurrent purge and/or pressurization.

The selective removal of product from the oxygen-rich discharge stream can be accomplished by monitoring the oxygen purity of the gas as it is discharged from the top of the bed. Based upon the minimum acceptable purity, gas would either be sent to the oxygen product storage tank or vented from the system. Alternatively, the product and vent fractions can be controlled by monitoring the oxygen purity of the gas in the oxygen product storage tank. Following the air feed and co-current nitrogen purge steps, the adsorbent and void spaces in the bed are heavily loaded with product quality nitrogen (purity greater than 98%, preferably greater than 99.8% oxygen free). The countercurrent blowdown and evacuation steps (7–10) are designed to collect product quality nitrogen in a variable volume receiver. High purity product nitrogen withdrawal is stopped in step 10 when the oxygen purge front begins to emerge from the feed end of the bed. This also coincides with a falling nitrogen purity.

The remaining evacuation/purge steps (11 and 12) are designed to regenerate the adsorbent. Nitrogen is further desorbed in these steps and vented as waste as the bed is prepared for the repeat of the adsorption steps.

These steps are designed in the present invention to achieve lower $N_2:O_2$ product ratios, e.g. less than 3:1. This is accomplished by decreasing the amount of time for the co-purge steps and increasing the amount of time for the feed air steps. The reduction in co-purge time increases the fraction of time that a feed/co-purge blower is utilized to feed air by approximately 10% over the prior art. This allows for an increase in the production of oxygen without increasing the size or cost of the equipment.

Figure 2:
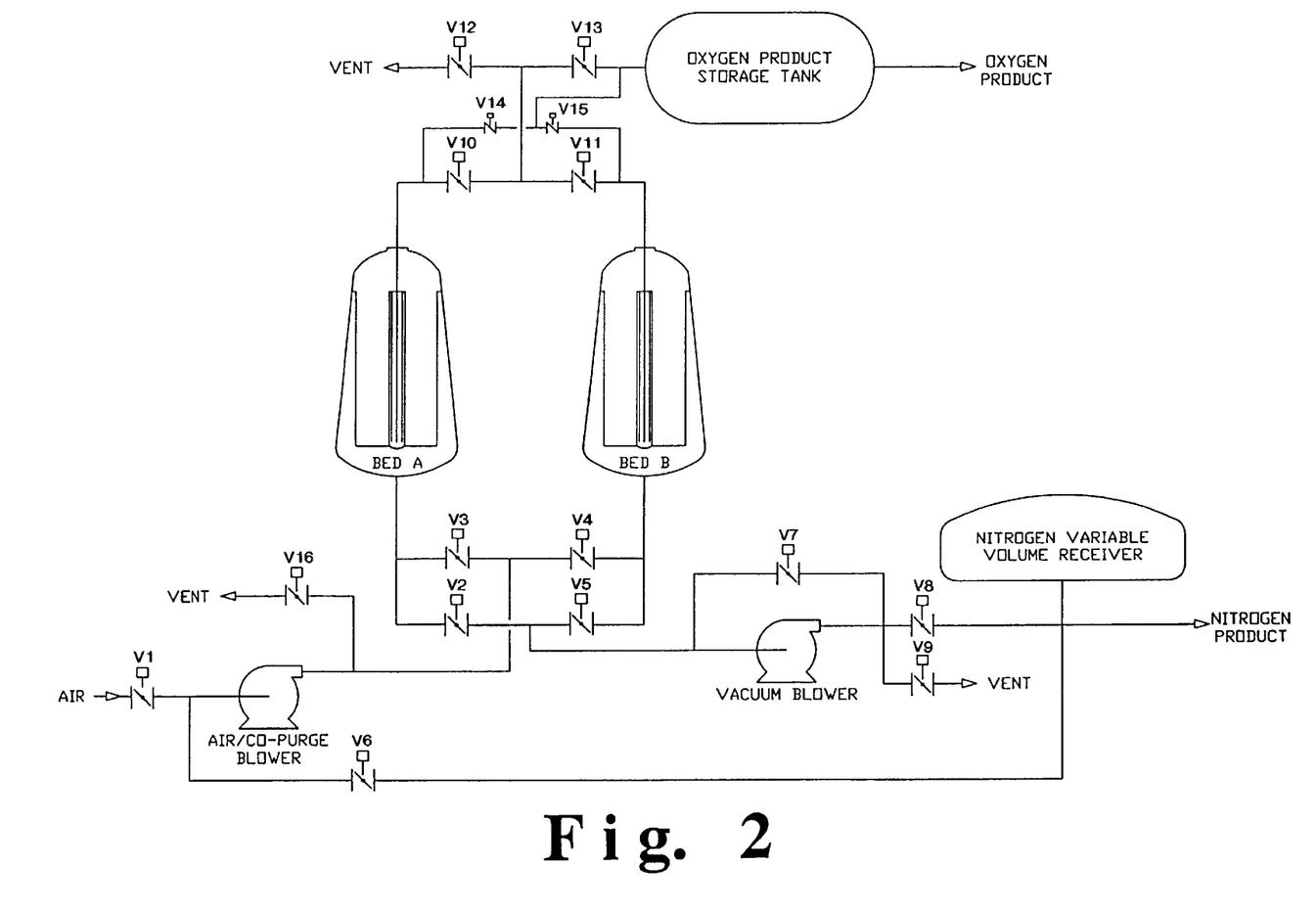
FIG. 2 is a schematic diagram of a vacuum PSA oxygen and nitrogen system of the invention.

The preferred conditions for the above process is a two-bed VPSA system suitable for performing the preferred process as detailed in the above section and shown in Table 1 and in FIG. 2. The example system is comprised of radial-flow adsorbent beds A and B, suitable oxygen and nitrogen storage vessels, a time-shared blower used for air feed and nitrogen co-purge, and a vacuum blower. The nitrogen storage tank could be made of a non-rigid material in order to provide variable receiver tank volume.

In the description below, the step numbers refer to the steps shown in FIG. 1 for bed A. Bed B is one-half cycle out of phase with Bed A. For example, Bed B undergoes steps 7 12 of FIG. 1 while Bed A is executing steps 1 6, respectively. At the start (step 1) of the cyclic processing sequence detailed in the above section and in Table 1, Bed A is at the lowest subatmospheric desorption pressure. Oxygen enriched product gas is used to backfill Bed A. Valve V14 is open to allow gas to flow from the oxygen product storage tank to the top of Bed A until a predetermined bed pressure level is reached in Bed A. During this step, the air/co-purge blower is not required. To avoid dead-ending the air/co-purge blower, valves V1 and V16 can be open to allow air to pass through the blower.

TABLE 1

| Step | Time (sec) | Starting Pressure (PSIA) | Ending Pressure (PSIA) |
| --- | --- | --- | --- |
| Step No. 1 - Product Oxygen Pressurization | 4.00 | 4.7 | 10.3 |
| Step No. 2 - Overlap Feed Adsorption/ | 2.25 | 10.3 | 15.8 |

TABLE 1-continued

| Step | Time (sec) | Starting Pressure (PSIA) | Ending Pressure (PSIA) |
|---|---|---|---|
| Product Oxygen Pressurization Step No. 3 - Raising Pressure Feed Adsorption | 6.80 | 15.8 | 21.4 |
| Step No. 4 - Co-current Nitrogen Purge/Product Oxygen Make | 5.00 | 21.4 | 22.4 |
| Step No. 5 - Co-current Nitrogen Purge/Product Oxygen Make | 5.00 | 22.4 | 22.4 |
| Step No. 6 - Nitrogen/Purge Oxygen Vent | 0.95 | 22.4 | 22.4 |
| Step No. 7 - Blowdown/Nitrogen Product | 4.00 | 22.4 | 15.0 |
| Step No. 8 - Evacuation/Nitrogen Product | 2.25 | 15.0 | 12.3 |
| Step No. 9 - Evacuation/Nitrogen Product | 6.80 | 12.3 | 9.9 |
| Step No. 10 - Evacuation/Nitrogen Product/Oxygen Purge | 5.00 | 9.9 | 7.5 |
| Step No. 11 - Evacuation/Nitrogen Vent/Oxygen Purge | 5.00 | 7.5 | 5.0 |
| Step No. 12 - Evacuation/Nitrogen Vent/Oxygen Purge | 0.95 | 5.0 | 4.7 |

The times, start/end pressures, and cycle steps may be changed depending on the adsorbent material used.

At the start of step 2, valve V16 is closed, valve V1 remains open, and valve V3 is opened to allow feed air into the bottom of bed A. Valve V14 remains open (from step 1) and oxygen backfill continues to the top of bed A. The overlapping of feed pressurization and oxygen backfill continues until a predetermined pressure is reached in bed A.

At the start of step 3, valve V14 closes to end the backfill process. Feed air continues to enter the bottom of bed A until the upper adsorption pressure is reached. Nitrogen is selectively adsorbed by the adsorbent. At this point the bed A pressure remains constant at the upper adsorption pressure and valve V10 opens and enriched oxygen is withdrawn from the top of bed A. Valve V13 is also open and the enriched oxygen passes to the oxygen product storage tank.

At the start of step 4, the bed A feed is switched from air to nitrogen co-purge gas. Valve V1 is closed to stop feed air flow and valve V6 is opened to allow high purity nitrogen (preferably >99.5% oxygen free) to flow from the nitrogen variable volume receiver through the air/co-purge blower through valve V3 and into the bottom of bed A. The pressure in bed A remains nearly constant during this step. Oxygen enriched gas continues to be withdrawn from the top of bed A and passes into the oxygen storage tank. This continues through step 5.

During step 6, the co-purge flow continues into the bottom of bed A and the nitrogen front has nearly reached the end of the bed. The purity of the oxygen enriched gas discharged from the top of the bed begins to decline. The purity decline can be determined by monitoring the purity of the oxygen enriched gas as it is discharged from the top of the bed or by monitoring the purity of the product gas in the oxygen storage tank. At about 70 to 75% $O_2$ purity, valve V13 closes to stop the flow of enriched oxygen into the oxygen product tank and valve V12 opens and the gas discharged from the top of bed A is vented from the system. This vent step allows the nitrogen purge gas to fully sweep out any residual oxygen in bed A.

When co-purge step 6 of Table 1 is complete in bed A, one half of the cycle sequence is complete and Bed A begins the depressurization sequence.

During step 7, Bed A is depressurized by blowing down high purity nitrogen gas into the nitrogen variable volume receiver. Valves V2, V7 and V8 are open to allow flow from bed A to the nitrogen variable volume receiver. Blowdown continues until the pressure in bed A is equal to that of ambient air pressure. During this step the vacuum blower is not required. To avoid dead-ending the vacuum blower, a small portion of the blowdown flow is allowed to pass through the blower.

During step 8, bed A undergoes a portion of its evacuation. Valve V7 is closed while valves V2 and V8 remain open to allow product quality nitrogen gas to pass through the vacuum blower and into the nitrogen variable volume receiver.

During steps 9 and 10, bed A continues to be evacuated as gas is removed from the bottom of bed A through the vacuum blower and is sent to the variable volume receiver. At the start of step 11, the nitrogen purity of the gas evacuated from bed A is falling and no longer desired for product or for co-purge (generally less than 99.75% purity). This can be determined by monitoring the purity of the gas as it is discharged from the vacuum pump. In this step, valve V8 closes to stop flow into the variable volume receiver and valve V9 opens to vent the evacuated gas from the system. This continues through step 12. In addition, during steps 10, 11, and 12 valve V14 opens to allow product quality oxygen purge gas to pass from the oxygen storage tank into the top of bed A.

When evacuation step 12 of Table 1 is complete in bed A, the cycle sequence is complete. Note that valves V15, V11, V5, and V4 perform equivalent functions on Bed B that valves V14, V10, V2, and V3 perform on Bed A, respectively.

The improvements achieved by the low nitrogen to oxygen product ratio process have been demonstrated by experiments. A highly exchanged LiX (2.0) adsorbent ($SiO_2$/$Al_2O_3$=2.0), with an average particle size of 1.4 mm, was used in the experiments. A reference performance was established using the process steps of this invention without the nitrogen vent on steps 11 and 12. The $N_2$:$O_2$ product ratio for the reference case is 2.92:1. This product ratio is just below the lower limit ratio (3:1) of the prior art process. The improved cycle (with reduced co-purge:feed air ratio) was also tested. The results have been normalized to the reference process and are compared in Table 2. These results demonstrate that a reduction in the co-purge:feed air ratio results in a reduced $N_2$:$O_2$ product ratio (1.97:1) while providing an increase in oxygen production without an increase in the size of the feed equipment or the amount of adsorbent.

TABLE 2

Pilot Plant Results

| Normalized Results | Low Product Ratio Case | Reference Case |
|---|---|---|
| Oxygen Production | 1.05 | 1 |
| Bed Size Factor | 0.98 | 1 |
| Oxygen Recovery | 0.99 | 1 |
| Feed Blower Displacement | 1 | 1 |
| Feed Air to Beds | 1.06 | 1 |
| Co-current purge to beds | 0.95 | 1 |

TABLE 2-continued

Pilot Plant Results

|  | Low Product Ratio Case | Reference Case |
|---|---|---|
| Process Results |  |  |
| Oxygen purity | 80.04 | 79.96 |
| Nitrogen Purity | 99.85 | 99.85 |
| Product Ratio ($N_2:O_2$) | 1.97:1 | 2.92:1 |
| Co-purge: Feed Gas Ratio | 1.04:1 | 1.16:1 |

The demonstrated improvements to process efficiency are affected through the manipulation of the breakthrough fronts. Under certain co-purge:feed air ratios, two separate concentration fronts were observed to emerge from the discharge end of the bed during the adsorption steps, i.e. an oxygen/air front followed by an air/nitrogen front. The Oxygen/air front is characterized by a sharp decline in oxygen concentration from about 85% to less than 21%. A region of constant Oxygen concentration with the oxygen purity of air (about 21% $O_2$) develops between these two fronts, depending upon the co-purge:feed air ratio. The second front (air/$N_2$) erupts from the bed as the Oxygen concentration declines from about 21% to less than 1%. The preferred co-purge:feed air ratio being less than about 1.15:1 with less than 1.05:1 being more preferred. The optimum co-purge:feed air ratio is dependent upon the amount of Oxygen in the feed gas. An oxygen content greater than 21% would require a lower co-purge:feed air ratio. The preferred ratio of 1.15 recited above is based on a feed gas of air containing about 21% oxygen. The region of constant purity is named the "air shelf".

Figure 3A:
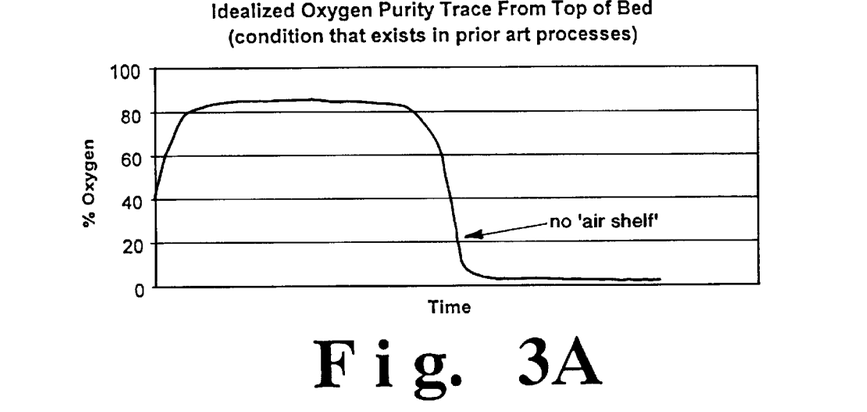
FIG. 3A is a graph of percent of oxygen versus time for oxygen purity trace from a top of a bed of the prior art.
Figure 3B:
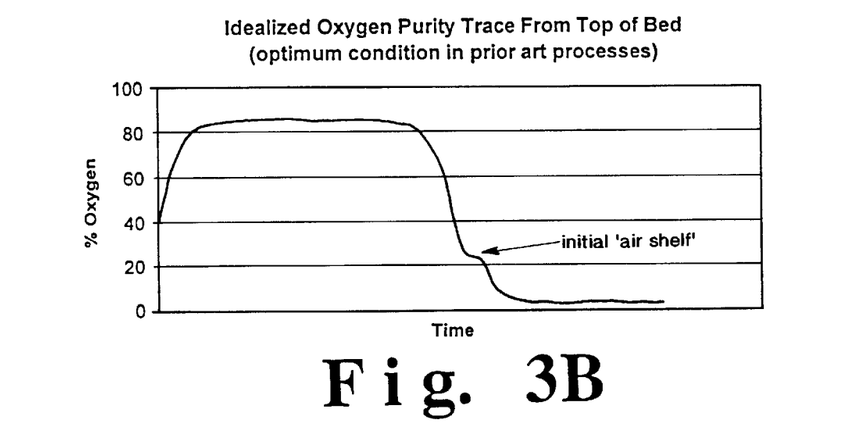
FIG. 3B is a graph of percent of oxygen versus time for oxygen purity trace from the top of a bed under optimum conditions in the prior art.
Figure 3C:
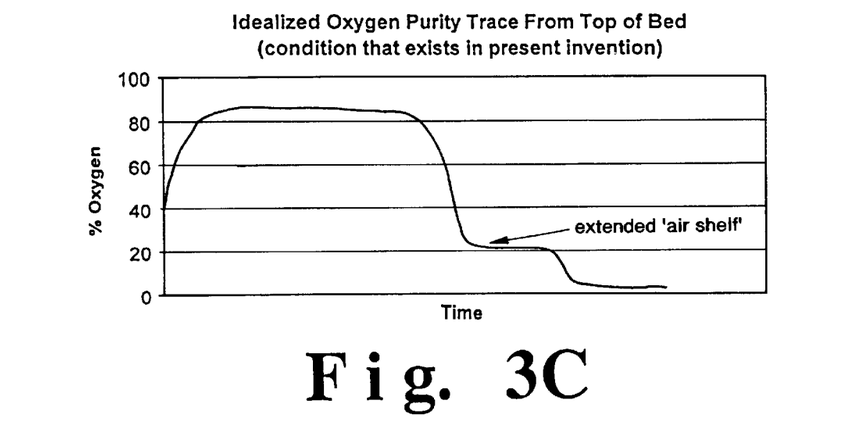
FIG. 3C is a graph of percent of oxygen versus time for oxygen purity trace from top of a bed under conditions of the present invention.

FIG. 3a shows a condition in which no air shelf is evident. This is the response obtained when the two fronts intersect and coalesce within the bed during the co-purge steps. This condition is consistent with the observations of the prior art of the breakthrough of the mass transfer zone. If these fronts intersect within the bed, the adsorbent located between this intersection point and the end of the bed provides no air separation, i.e. the coalesced front divides regions of high purity nitrogen and oxygen as there is no air left in the bed. Such a condition represents less than optimal feed air to the process relative to the amount of adsorbent in the bed. The highest adsorbent productivity is obtained when the fronts almost, but not quite, intersect near the discharge end of the bed as illustrated in FIG. 3b. This condition represents the beginning of the air shelf formation. This air shelf extends in time as the co-purge:feed air ratio is reduced or if the bed depth is too short for the amount of feed air provided. In the latter, compressed air is wasted. An extended air shelf is shown in FIG. 3c. In the present invention, the reduction of the co-purge:feed air ratio results in the formation of an extended air shelf. This air shelf is contained within the bed. While initially considered undesirable, this condition provides the unexpected benefit of additional countercurrent purging with air.

In prior processes, the bed was saturated with high purity nitrogen at the end of the nitrogen co-purge. The subsequent countercurrent blowdown step resulted in desorption of nitrogen as desired, and no effective purging with co-product oxygen, i.e. since there is almost no oxygen remaining in the bed. In order to maximize the recovery of high purity nitrogen, the oxygen purging is delayed until the end of the evacuation step.

One embodiment of the present invention is directed at applications where not as much high purity nitrogen is required. It is permissible for oxygen to break through at the feed end of the bed earlier in the evacuation/purge step as long as a sufficient amount of high purity nitrogen product has already been collected. By reducing the co-purge nitrogen in favor of increased air feed, it is generally preferred to leave an air shelf in the bed at the end of the co-purge step. This air, containing 21% oxygen, provides a first purging of the top of the bed during the blowdown step. This gas continues to purge the lower sections of the bed during the evacuation steps. At the end of the evacuation steps, the bed has been more effectively desorbed than that obtained in the prior art, high product ratio processes. As a result, the nitrogen working capacity of the bed increases to enable higher production of oxygen co-product. The amount of the air shelf retained in the bed, coupled with the co-purge:feed air ratio, are important to the overall efficiency of this reduced product ratio process.

Additional improvements to this new co-products process can be derived from the use of advanced high performance adsorbents such as Type X; Type A; naturally occurring zeolites; small-bead adsorbents preferably having an average particle sized between 0.5 mm and 2.0 mm; the use of at least two layers of adsorbents having different physical and/or adsorption characteristics; radial-flow, axial-flow and/or lateral flow beds; and the application of lower pressure ratio cycles to further improve the efficiency and reduce the cost of the process of this invention. Since all of these modifications influence the character of the concentration fronts in the process, each is implemented using the novel strategy described above wherein the co-purge:feed air ratio is reduced to achieve the desired co-product ratio while simultaneously retaining an air shelf within the bed.

While a wide variety of adsorbent materials may thus be employed in the practice of the invention for air separation or other desirable gas separation operations employing the PSA process and system of the invention, it has been found particularly desirable to employ the lithium cation forms of zeolite X in the practice of particular embodiments of the invention for the recovery of nitrogen and oxygen from air. The LiX adsorbent material is found to exhibit an extraordinary capacity and selectivity toward the adsorption of nitrogen and oxygen from air. The LiX adsorbent materials desirably used in the practice of the invention are the lithium cation forms of zeolite X in which the framework $SiO_2/Al_2O_3$ molar ratio is from about 2.0 to about 3.0 and in which at least about 88% of the $AlO_2$-tetrahedral units are associated with lithium cations. Highly exchanged low $SiO_2/Al_2O_3$ ratio LiX adsorbents have high working capacity and high working separation efficiency. The use of these adsorbents in the present invention will reduce the bed size factor and power, and increase product recovery and yield.

All of the concepts of this invention apply generally to a full range of process conditions, e.g. temperature, pressure, pressure ratio, feed velocity, etc. Likewise, these concepts can be applied to single-bed as well as multi-bed processes operating with sub-atmospheric (VSA), trans-atmospheric (VPSA), or super-atmospheric (PSA) cycles. The concepts described here are not limited to any particular adsorber configuration and can be effectively applied to axial flow, radial flow, lateral flow, etc. adsorbers.

The present invention may be practiced with various deployments of adsorbents in the main adsorbent zone, e.g.

layers and mixtures of adsorbents of various types or the same type but with varying adsorption and/or physical characteristics.

Variations to the process described in Table 1 may also be utilized. The overlapping of air feed with oxygen backfill in step 2 could be eliminated. In this less preferred configuration, step 2 would include only the oxygen back fill step, while air feed would start in step 3. This modified process could result in an 8% to 10% increase in unit power and a 3% to 5% decrease in oxygen production.

The oxygen purge gas in steps 10, 11, and 12 could be provided directly from the top of another bed in the process instead of from the oxygen product storage tank. One skilled in the art will recognize that other modifications to the process steps can be made while maintaining the overall intent and benefits of the invention.

The concept of the air shelf may also be enlisted, by monitoring the light component (oxygen) purity, to finely control the co-purge:feed air ratio. The air shelf time duration can be used as a control variable so that the amount of co-purge in the subsequent cycle steps can be either decreased or increased as necessary to maintain the air shelf duration within a predetermined range (set point).

It will be appreciated from the above that the operating conditions employed in the practice of the invention, such as the generally preferred 2-bed embodiments disclosed herein, are flexible, facilitating the satisfying of the requirements for co-producing gas separation operation. Thus, the constraints associated with any particular end user application, e.g. product pressure, power consumption, product purity and the like, can be readily accommodated, while the overall cost of providing desired co-producing oxygen and nitrogen products is minimized. Purity oxygen and nitrogen gases can be conveniently produced at high recovery levels, therefore, at desirably low operating and capital costs resulting from the relativity low compression ratios and equipment capacity requirements associated with the practice of the invention. A significant advance in the PSA art is thus achieved by the practice of the subject invention, particularly with respect to the desirable production of a larger amount of purity oxygen from air along with nitrogen in economical vacuum cycle operations.

Obviously, many modifications and variations of the present invention are possible in light of the above. Thus, it is to be understood that, within the scope of the appended claims, this invention may be practiced otherwise than as specifically described above.

What is claimed is:

1. A pressure swing adsorption/desorption process for the co-production of a more readily adsorbable gas component and a less readily adsorbable gas component from a feed gas mixture; comprising the feeding of the feed gas into at least one adsorbent bed containing an adsorbent material for removing undesirable components and then in a cycle sequence of adsorbing, desorbing and co-purging the more readily adsorbable gas component in the bed producing a product ratio of the more readily adsorbable gas component to the less readily adsorbable gas component of less than about 3:1 by maintaining the co-purge:feed gas ratio of the process to less than about 1.15:1.

2. The pressure swing adsorption/desorption process of claim 1 wherein the more readily adsorbable gas component is nitrogen and the less readily adsorbable gas component is oxygen.

3. The pressure swing adsorption/desorption process of claim 1 wherein the feed gas mixture is air.

4. The pressure swing adsorption/desorption process of claim 1 wherein the product ratio of the nitrogen to the oxygen is about 2:1.

5. The pressure swing adsorption/desorption process of claim 1 wherein the ratio of the co-purge:feed gas is less than 1.05:1.

6. The pressure swing adsorption/desorption process of claim 1 wherein said adsorbent comprises at least one zeolite selected from the group comprising Type X zeolite, Type A zeolite and naturally occurring zeolites containing monovalent, multivalent or mixed cations.

7. The pressure swing adsorption/desorption process of claim 6 wherein the adsorbent is LiX.

8. The pressure swing adsorption/desorption process of claim 6 wherein the average particle size of the adsorbent material is between about 0.5 and 2.0 mm.

9. The pressure swing adsorption/desorption process of claim 8 wherein the ratio of the co-purge:feed gas is less than 1.05:1.

10. A pressure swing adsorption process for a system for the co-production of a more readily adsorbable gas component and a less readily adsorbable gas component having a product ratio of said more readily adsorbable gas component to said less readily adsorbable gas component of less than about 3:1 in an adsorption system having at least two adsorbent beds containing adsorbent material capable of selectively adsorbing said more adsorbable gas component and said less adsorbable gas component from said feed gas mixture with said feed gas mixture being introduced into the feed end of the bed, said more adsorbable gas component being withdrawn from said feed end and said less adsorbable gas component being withdrawn from the discharge end of the bed while maintaining the co-purge:feed gas ratio of less than about 1.15:1; each bed, on an alternating basis, undergoing a processing cycle sequence comprising:

(a) introducing the less readily adsorbable component into the discharge end of the bed to partially countercurrently repressurize the bed from its subatmospheric desorption pressure level to an intermediate pressure level;

(b) passing the feed gas mixture to the feed end of the bed, the bed being cocurrently repressurized from said intermediate pressure to its upper adsorption pressure, with said less readily adsorbable gas component being selectively withdrawn from the discharge end of the bed, a portion of which is withdrawn as product with the remaining portion of said less readily adsorbable gas component being passed directly to another bed in the system for said countercurrent backfilling repressurization of step (a) or for the purging of the bed and/or being passed to a surge tank for subsequent use in such backfilling or purge steps;

(c) passing the more readily adsorbable gas component to the feed end of the bed at said upper adsorption pressure so as to cocurrently purge said bed, with a co-purge:feed gas ratio of less than about 1.15:1, and said less readily adsorbable gas component being withdrawn from the discharge end of the bed;

(d) countercurrently depressurizing the bed by discharging said more readily adsorbable gas component from the feed end of the bed;

(e) countercurrently purging the bed by introducing said less readily adsorbable gas component to the discharge end of the bed and said more readily adsorbable gas component being discharged from the feed end of the bed, and said more readily adsorbable gas either withdrawn from the system, vented or stored in a surge tank for use as purge gas in the process; and (f) repeating steps (a)–(e) on a cycle basis.

11. The pressure swing adsorption/desorption process of claim 10 wherein the more readily adsorbable gas component is nitrogen and the less readily adsorbable gas component is oxygen.

12. The pressure swing adsorption/desorption process of claim 10 wherein the feed gas is air.

13. The pressure swing adsorption/desorption process of claim 10 wherein the product ratio of the nitrogen to the oxygen is about 2:1.

14. The pressure swing adsorption/desorption process of claim 10 wherein the ratio of the co-purge:feed gas is less than 1.05:1.

15. The pressure swing adsorption/desorption process of claim 10 wherein said adsorbent comprises at least one zeolite selected from the group comprising Type X zeolite, Type A zeolite and naturally occurring zeolites containing monovalent, multivalent or mixed cations.

16. The pressure swing adsorption/desorption process of claim 15 wherein the adsorbent is LiX.

17. The pressure swing adsorption/desorption process of claim 15 wherein the average particle size of the adsorbent material is between about 0.5 and 2.0 mm.

18. The pressure swing adsorption/desorption process of claim 17 wherein the ratio of the co-purge:feed gas is less than 1.05:1.

19. The pressure swing adsorption/desorption process of claim 18 wherein the product ratio of the nitrogen to the oxygen is about 2:1.

20. The pressure swing adsorption/desorption process of claim 19 wherein the adsorbent is LiX.

* * * * *